United States Patent Office 2,973,370
Patented Feb. 28, 1961

2,973,370

17β-HYDROXY-4-OXAANDROSTAN-3-ONES AND DERIVATIVES THEREOF

Norman W. Atwater, Arlington Heights, Ill., assignor to G. D. Searle & Co., Chicago, Ill., a corporation of Delaware No Drawing. Filed May 22, 1959, Ser. No. 814,964

7 Claims. (Cl. 260—343.2)

The present invention relates to a new group of oxasteroids and more particularly to 17β-hydroxy-4-oxaandrostan-3-one, its 17β-esters, and its 5-substituted derivatives.

The compounds which constitute this invention are those of the structural formula

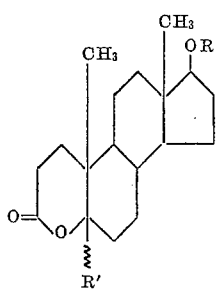

The radical R is either hydrogen or an acyl radical derived from a hydrocarbon carboxylic acid of less than 8 carbon atoms such as formic, acetic, propionic, valeric, caproic, benzoic and cyclohexanecarboxylic acid and the like. The radical R' can be hydrogen, fluorine, chlorine, bromine, or an ether radical such as methoxy, ethoxy, propoxy, butoxy, pentyloxy, hexyloxy, benzyloxy or allyloxy.

The compounds of this invention are active pharmacological agents and are active specifically as anabolic and androgenic agents. They are also anti-infective agents and are particularly active in preventing the spread of infection caused by cortisone. For example, they prevent the fatal action of Coxsackie virus on mice treated with cortisone.

The compounds of this invention are conveniently prepared from the esters of testosterone by the following reaction sequence. An ester of testosterone such as the benzoate is ozonized and then treated with hydrogen peroxide to yield the 17-ester of 5-oxo-17β-hydroxy-3,5-seco-A-norandrostan-3-oic acid. This seco steroid is treated with at least one equivalent of an alkali metal borohydride or alkali metal aluminum hydride, e.g. sodium borohydride, at room temperature to yield the 17-ester of 17β-hydroxy-4-oxa-5-androstan-3-one as a mixture of the 5α and 5β isomers. The 5α-isomer is less soluble in methanol and can thus be separated from the 5β-isomer. The free 17-hydroxy compound can be prepared from the ester by alkaline saponification followed by acidification.

Treatment of the 17-ester of 5-oxo-17β-hydroxy-3,5-seco-A-norandrostan-3-oic acid with a thionyl halide at room temperature yields the ester of 17β-hydroxy-5-halo-4-oxaandrostan-3-one. The 5-halogen, typically the 5-chloro substituent, can be replaced with an alkoxy group by treating with the corresponding alkanol in a base, typically pyridine, to yield the 17-ester of 17β-hydroxy-5-alkyloxy-4-oxaandrostan-3-one. Similarly, the 5-benzyl and 5-alkenyl ethers are prepared by use of benzyl alcohol or an alkenol. The free 17-hydroxy derivatives of the 5-alkyloxy, benzyloxy and alkenyloxy substituted compounds can be prepared by alkaline saponification.

The invention will appear in further detail from the following examples which are given for the purpose of illustration only and are not to be construed as limiting the invention in spirit or in scope. In these examples quantities are given as parts by weight.

Example 1

A solution of 7 parts of 17β-benzoyloxyandrost-4-en-3-one in 110 parts of ethyl acetate and 120 parts of acetic acid is cooled to —5° C. Oxygen containing 3 parts of ozone is passed into the solution during a 45 minute period. The solution is allowed to come to room temperature and 5 parts of 30% hydrogen peroxide and 15 parts of water are added. After standing for 16 hours, the mixture is diluted with 500 parts of ether and washed thoroughly with water. After exhaustive extraction of the organic layer with sodium hydroxide, the basic extracts are acidified with concentrated hydrochloric acid and extracted with ether. The ethereal solution is washed with water, dried over anhydrous sodium sulfate, and distilled under a vacuum to leave a viscous residue which is recrystallized from a methanol-water mixture and then from isopropyl ether to give 17β-benzoyloxy-5-oxo-3,5-seco-A-norandrostan-3-oic acid melting at about 175–176° C. The optical rotation of the compound is +127°.

By equimolar substitution of 17β-acetoxyandrost-4-en-3-one or 17β-propionoxyandrost-4-en-3-one for the 17β-benzoyloxyandrost-4-en-3-one in the above process, 17β-acetoxy-5-oxo-3,5-seco-A-norandrostan-3-oic acid or 17β-propionoxy-5-oxo-3,5-seco-A-norandrostan-3-oic acid respectively are obtained.

Example 2

To a solution of 24.7 parts of 17β-benzoyloxy-5-oxo-2,3-seco-A-norandrostan-3-oic acid in 190 parts of ethanol are added 2.35 parts of sodium borohydride in 10 parts of water and 24 parts of ethanol. The mixture is allowed to stand for 90 minutes at room temperature after which it is diluted with 800 parts of water. The resulting mixture is acidified with hydrochloric acid and extracted with ether. The ethereal solution is washed with water, dried over anhydrous sodium sulfate, and evaporated to yield a residue which is recrystallized from methanol to yield 17β-benzoyloxy-4-oxa-5α-androstan-3-one melting at about 207–208.5° C. The compound has an optical rotation of +102°. The residue obtained on evaporation of the mother liquors yields, on recrystallization from a mixture of acetone and isopropylether, 17β - benzoyloxy - 4 - oxa - 5β-androstan-3-one melting at about 165.5–167.5° C. The compound has an optical rotation of +67° and has the structural formula

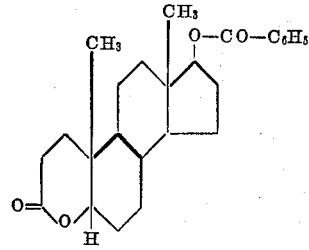

By equimolar substitution of 17β-acetoxy-5-oxo-3,5-seco-A-norandrostan-3-oic acid and 17β-propionoxy-5-oxo-3,5-seco-A-norandrostan-3-oic acid for the 17β-benzoyloxy-5-oxo-3,5-seco-A-norandrostan-3-oic acid in the above procedure, the epimeric pairs of 17β-acetoxy-4-oxa-5α- and 5β-androstan-3-one and 17β-propionoxy-4-oxa-5α and 5β-androstan-3-one respectively are obtained.

Example 3

To a solution of 1.8 parts of 17β-benzoyloxy-4-oxa-5α-androstan-3-one in 85 parts of dioxane, there are added 5 parts of potassium hydroxide dissolved in 50 parts of water. The mixture is refluxed for 3 hours, poured into 600 parts of water, and acidified with concentrated hydrochloric acid. Upon standing a precipitate forms which is recrystallized from ethyl acetate to yield 17β-hydroxy-4-oxa-5α-androstan-3-one melting at about 178.5–180.5° C. The compound has an optical rotation of +96°. It has the structural formula

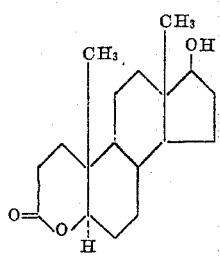

Example 4

A solution of 1.8 parts of 17β-benzoyloxy-4-oxa-5β-androstan-3-one in 85 parts of dioxane is treated with 5 parts of potassium hydroxide dissolved in 50 parts of water. The mixture is refluxed for 3 hours, poured into 600 parts of water, and acidified with concentrated hydrochloric acid. Upon standing a precipitate forms which is recrystallized from ethyl acetate to yield 17β-hydroxy-4-oxa-5β-androstan-3-one melting at about 202–203° C. The compound has an optical rotation of +9°.

Example 5

A mixture of 1.5 parts of 17β-benzoyloxy-5-oxo-3,5-seco-A-norandrostan-3-oic acid, 50 parts of acetic acid, and 0.75 part of platinum oxide is shaken in an atmosphere of hydrogen until no more gas is absorbed. The platinum is removed by filtration and the acetic acid is removed by distillation. The residue is chromatographed on a column containing silica gel and the fractions which are eluted with a solution of 10% ethyl acetate in benzene are crystallized from methanol to give 17β-cyclohexanecarboxy-4-oxa-5β-androstan-3-one melting at about 200.5–203.5° C. The compound has an optical rotation of +12°. It has the structural formula

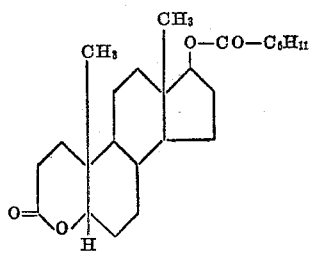

Example 6

A solution of 17β-hydroxy-4-oxa-5β-androstan-3-one in 4.5 parts of benzene, 0.3 part of cyclohexanecarbonyl chloride, and 0.5 part of pyridine is allowed to stand for 16 hours at 25° C., and is then partitioned between ether and water. The organic layer is washed with dilute hydrochloric acid and water and dried over anhydrous sodium sulfate. Upon evaporation of the ether, the residue is recrystallized from methanol to give 17β-cyclohexanecarboxy-4-oxa-5β-androstan-3-one, melting at about 203–204° C.

Example 7

After dissolving 1.03 parts of 17β-benzoyloxy-5-oxo-3,5-seco-A-norandrostan-3-oic acid in 9 parts of dry benzene, the solution is treated with 5 parts of thionyl chloride and allowed to stand for 48 hours at 3° C., while being protected from atmospheric moisture. The volatile components are then removed by vacuum distillation and the residue is triturated with cold acetone. The solid residue is collected and recrystallized from acetone to give 17β-benzoyloxy-5-chloro-4-oxaandrostan-3-one melting at about 187–191° C. The optical rotation of this compound is +61°.

By equimolar substitution of thionyl bromide and thionyl fluoride for thionyl chloride in the above example, 17β-benzoyloxy-5-bromo-4-oxaandrostan-3-one and 17β-benzoyloxy-5-fluoro-4-oxaandrostan-3-one respectively, are obtained. The latter has the structural formula

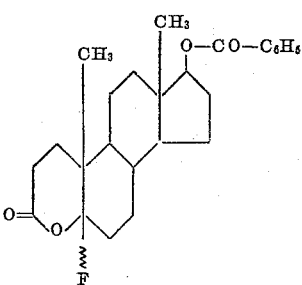

Example 8

A mixture of 0.28 part of 17β-benzoyloxy-5-chloro-4-oxaandrostan-3-one, 4 parts of methanol and 5 parts of pyridine is heated and then allowed to stand for 90 hours at room temperature. The insoluble product is collected by filtration and recrystallized from dichloro-methane-methanol to give 17β-benzoyloxy-5-methoxy-4-oxa-androstan-3-one melting at about 238–242° C. The compound has an optical rotation of +72°.

Substitution of 5 parts of ethanol for the methanol used in the above example yields 17β-benzoyloxy-5-ethoxy-4-oxaandrostan-3-one of the structural formula

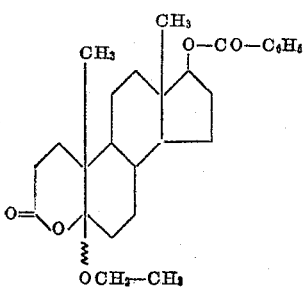

Example 9

After dissolving 0.35 part of 17β-benzoyloxy-5-chloro-4-oxaandrostan-3-one in 4.5 parts of allyl alcohol and 5 parts of pyridine by heating, the mixture is allowed to stand at room temperature for 72 hours and then poured into 125 parts of water. The resulting slurry is extracted with dichloromethane and the organic layer is washed with dilute hydrochloric acid and then with water. The dichloromethane is evaporated to leave a residue which is recrystallized from dichloromethane-methanol and dichloro-petroleum ether to yield 17β-benzoyloxy-5-allyloxy-4-oxaandrostan-3-one melting at about 160.5–164.5° C. The compound has an optical rotation of +67°.

Example 10

By equimolar substitution of benzyl alcohol for allyl alcohol in the procedure of Example 9 17β-benzoyloxy-5-benzyloxy-4-oxaandrostan-3-one melting at about 230–236° C. is obtained. The compound has an optical rotation of +67°.

What is claimed is:

1. A member of the class consisting of the compounds of the structural formula

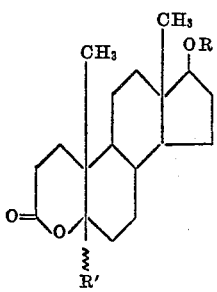

wherein R is lower alkanoyl, and R' is a member of the class consisting of hydrogen, halogen of atomic weight less than 100, lower alkyloxy, allyloxy and benzyloxy.

2. A compound of the formula

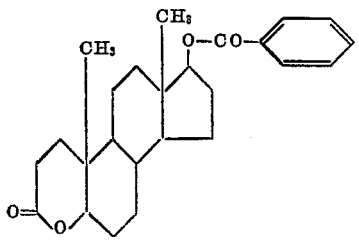

3. 17β-cyclohexanecarboxy-4-oxa-5β-androstan-3-one.

4. A compound of the formula

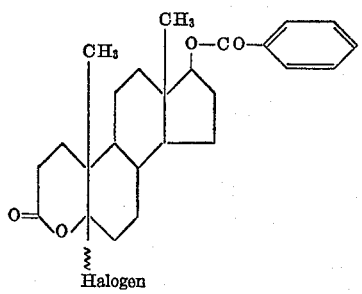

5. A compound of the formula

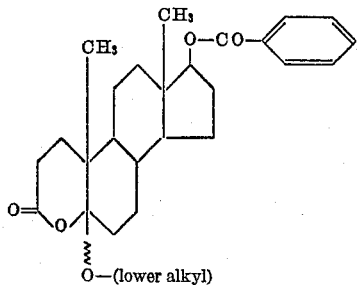

6. 17β-benzoyloxy-5β-allyloxy-4-oxaandrostan-3-one.
7. 17β-benzoyloxy-5β-benzyloxy-4-oxaandrostan-3-one.

No references cited.

UNITED STATES PATENT OFFICE
CERTIFICATE OF CORRECTION

Patent No. 2,973,370            February 28, 1961

Norman W. Atwater

It is hereby certified that error appears in the above numbered patent requiring correction and that the said Letters Patent should read as corrected below.

Column 2, line 37, for "2,3-seco-" read -- 3,5-seco- --; column 4, lines 65 and 66, for "dichloro-petroleum" read -- dichloromethane-petroleum --.

Signed and sealed this 17th day of October 1961.

(SEAL)
Attest:

ERNEST W. SWIDER
Attesting Officer

DAVID L. LADD
Commissioner of Patents